Dec. 11, 1945.  W. W. SCOTT ET AL  2,390,741
GAUGING MACHINE
Filed Feb. 10, 1944  3 Sheets-Sheet 2
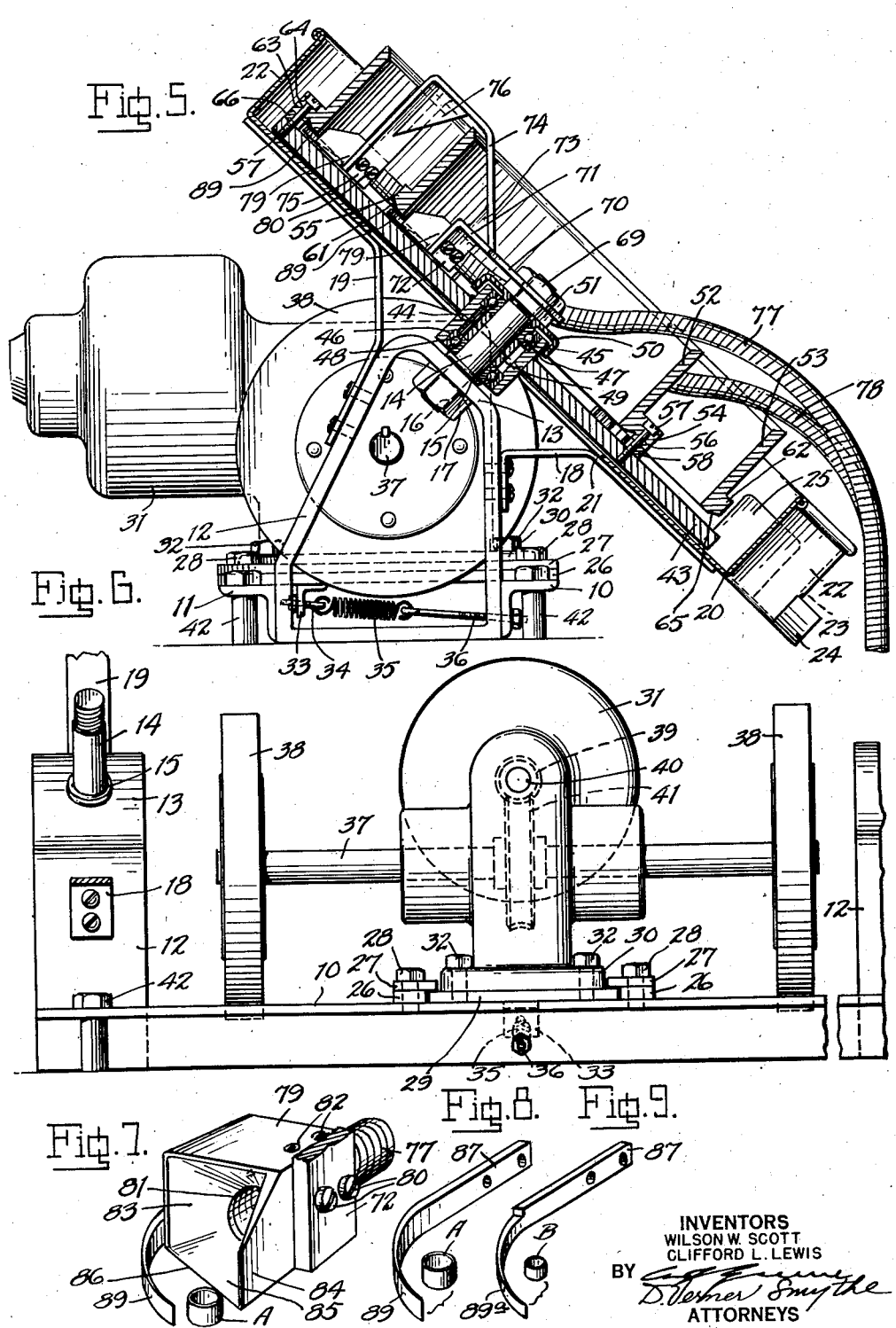
INVENTORS
WILSON W. SCOTT
CLIFFORD L. LEWIS
BY
ATTORNEYS

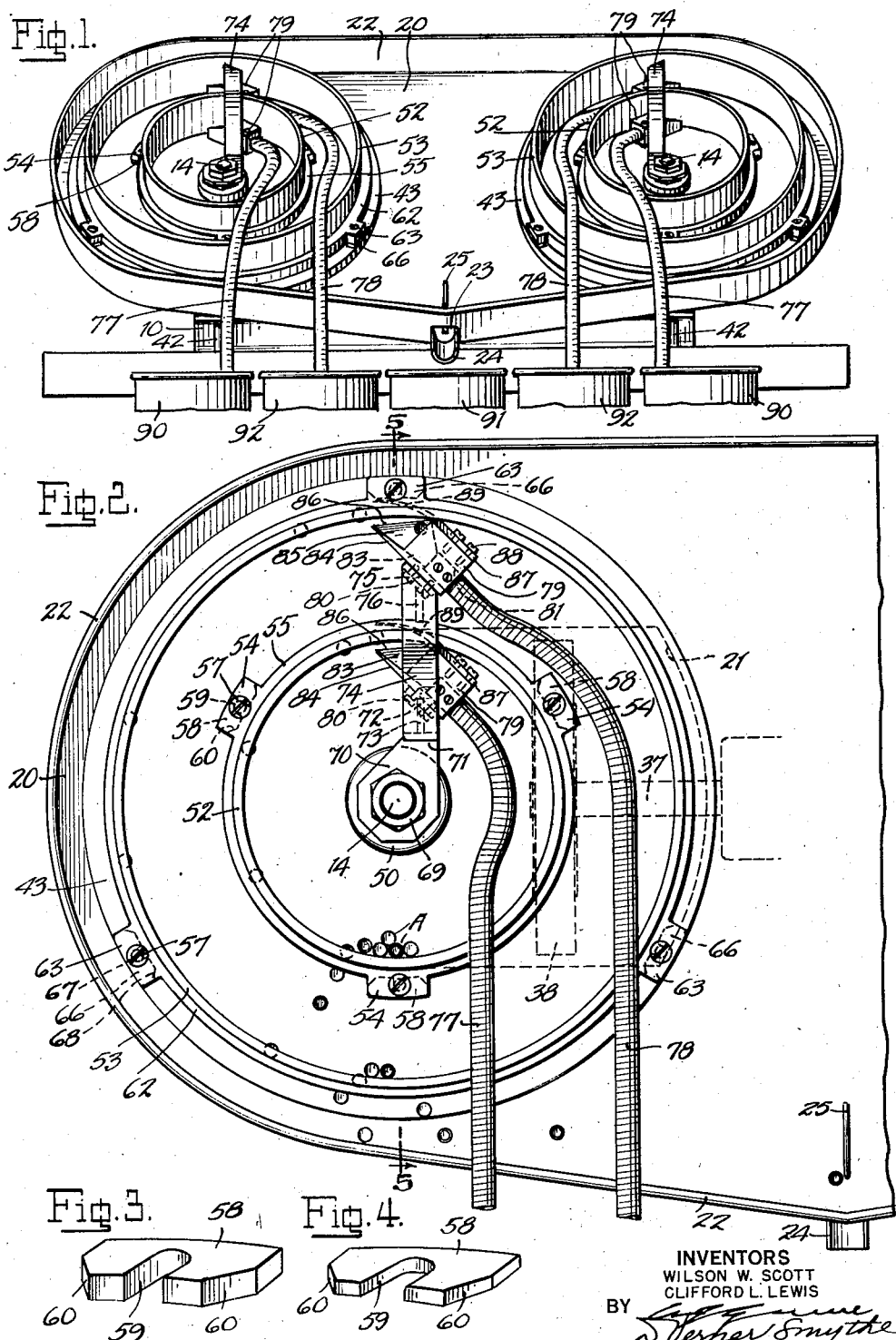

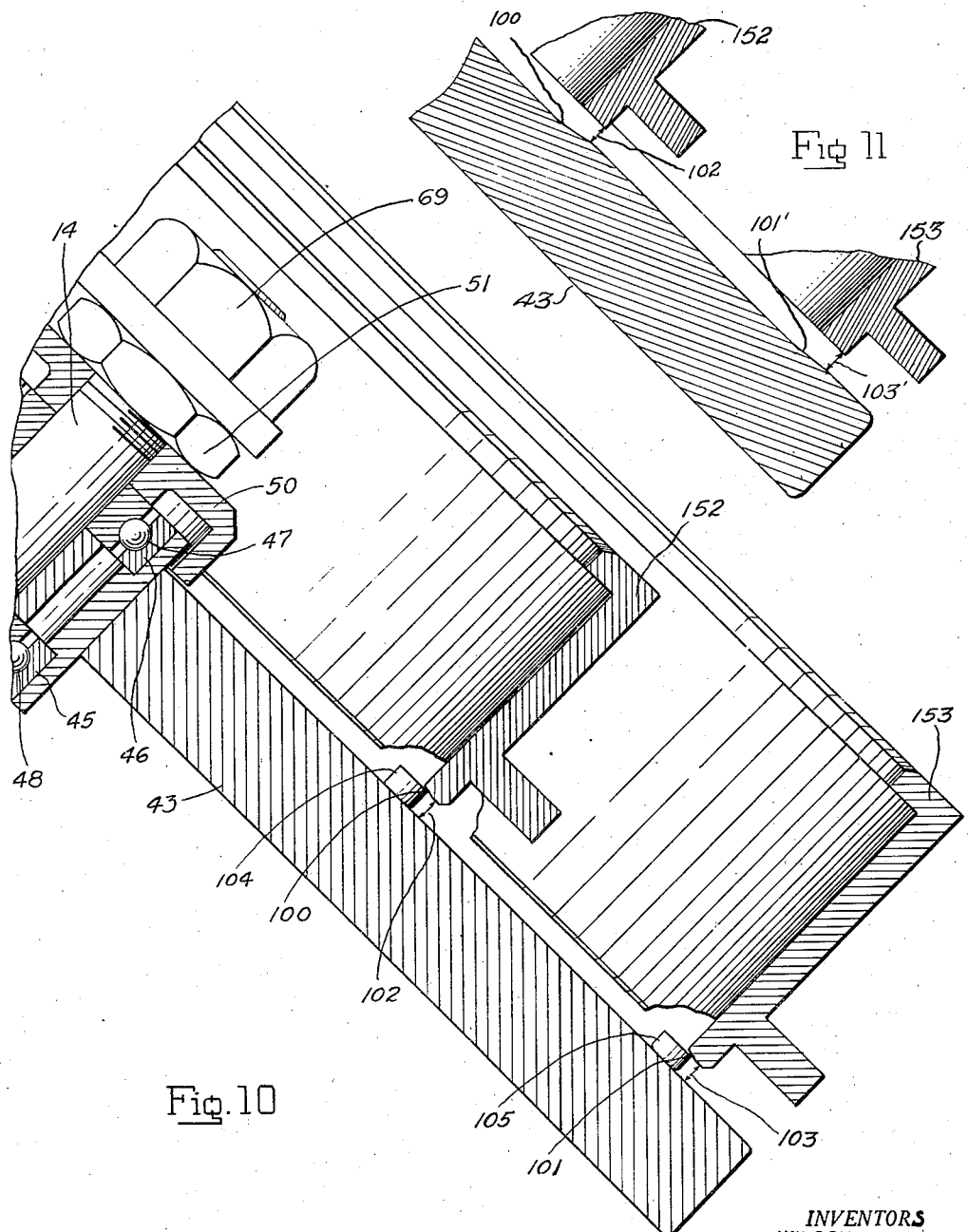

Patented Dec. 11, 1945

2,390,741

UNITED STATES PATENT OFFICE 2,390,741

GAUGING MACHINE

Wilson W. Scott, Independence, Mo., and Clifford L. Lewis, Hanford, Wash., assignors to Remington Arms Company, Inc., Bridgeport, Conn., a corporation of Delaware Application February 10, 1944, Serial No. 521,860

15 Claims. (Cl. 209—90)

The present invention relates to a gauging machine, particularly for sorting articles as to height, through separation of over and under height articles from those of proper height, it being an object of the invention to provide an automatic machine which will accurately gauge the articles within very close precision limits and will automatically feed the separated articles of proper height to a suitable receptacle, while the separated over and under height articles are automatically fed to other receptacles. This application is a continuation-in-part of the prior copending application, Serial No. 482,844, filed April 13, 1943. While it will be obvious from the disclosure, and the following description, that the machine is adapted for the gauging of various types of articles, the present disclosure is particularly concerned with the gauging and sorting of ammunition primer cups, which must be gauged very accurately in order to function properly when incorporated in the cartridge. These primer cups are of relatively small size and light weight, so that manual inspection of them, as heretofore practiced, is time consuming and expensive, as well as inaccurate, the latter condition being due in large part to human error because of the minute size of the cups which fosters fatigue, both mental and optic.

A further object of the invention is to provide a machine which may be conveniently adapted to the gauging of articles of different sizes, as for instance, .30 or .50 caliber primer cups, by the alternate use therein of removable gauging spacer members, which may be very accurately dimensioned and which determine the gauging dimensions of the machine, the machine being adapted for the gauging of any particular size article simply by inserting spacer members of the desired gauging dimensions therein. These spacer members constitute "go" and "no go" gauging means, which respectively control gauging spaces in the machine in relation to which the articles are automatically brought, a too high article failing to pass through the "go" space, a proper height article passing through the "go" space and failing to pass through the "no go" space, and a too low article passing through both the "go" and "no go" space.

With the above and other objects in view, an embodiment of the invention is shown in the accompanying drawings, and this embodiment will be hereinafter more fully described with reference thereto, and the invention will be finally pointed out in the claims.

In the drawings:

Fig. 1 is a front elevation of a gauging machine, according to the illustrated exemplary embodiment of the invention.

Fig. 2 is a top plan view, on an enlarged scale, of one of the rotary gauging units employed.

Fig. 3 is a perspective view of one of the gauging space determining spacer members employed in the machine.

Fig. 4 is a perspective view of one of the spacer members of different dimension than that shown in Fig. 3, for alternative use in the machine.

Fig. 5 is a vertical sectional view, partially in end elevation, taken along the line 5—5 of Fig. 2.

Fig. 6 is a front elevation, partially broken away, of the supporting frame of the machine, the hopper and rotary gauging units being removed.

Fig. 7 is a perspective view of one of the tube head members employed in the machine.

Fig. 8 is a perspective view of one of the tube head finger members employed in the machine, and showing one of the primer cups to be gauged in relation thereto.

Fig. 9 is a perspective view of one of the finger members of different dimension than that shown in Fig. 8 for alternative use in the machine, and showing one of the primer cups to be gauged in relation thereto.

Fig. 10 is a fragmentary sectional elevation showing a modified form of the gauging gap, part of this view being enlarged to more clearly show the modification.

Fig. 11 is a fragmentary sectional elevation similar to Fig. 10, showing another modification of the gauging gap.

Similar reference characters indicate corresponding parts throughout the several figures of the drawings.

Referring to the drawings, the gauging machine, according to the exemplary illustrated embodiment of the invention, is preferably of dual form, that is, two rotary gauging units are employed in a single machine and are arranged to be simultaneously driven by a single intermediately disposed driving motor, the dual gauging units being of identical form and disposed symmetrically at each side of the driving motor in right and left arrangement, the right hand unit being adapted to be rotated in counter-clockwise direction while the left hand unit is rotated in clockwise direction. In the following description only one unit will be described in detail. It is also pointed out that the invention contemplates a machine of the dual type as illustrated, as well as a single unit machine.

The gauging machine comprises a supporting base consisting of a pair of longitudinally disposed spaced parallel angle bars 10 and 11 transversely connected at each end by a transverse upwardly extending yoke-shaped standard 12, preferably welded to the angle bars. The standard 12 is provided at its upper end with an apertured angularly disposed mounting portion 13 to which is fixedly secured a spindle shaft 14 having a flange 15, engaging the upper surface of the mounting portion, and a threaded extension 16 engaged through the aperture and secured by a nut 17 engaging the under-surface of the standard. This spindle shaft is adapted to rotatably support the rotatable gauging unit, as will hereinafter more fully appear, it being pointed out that the angle of the spindle and of the rotary gauging unit is preferably 45°, although it will be understood that any suitable angle may be employed.

To the forward vertical portion and the rearward inclined portion of the standard there are respectively secured bracket arms 18 and 19 secured by welding or other suitable means to the underside of a pan hopper 20, this hopper being common to the two units in the illustrated embodiment of the invention, and being supported at its respective ends by the bracket arms of the standard at each end of the supporting base. In surrounding relation to the spindle shaft 14, the hopper is provided with an opening 21 through which the driving wheel for rotating the gauging unit is engaged therewith, as will hereinafter more fully appear. The hopper is provided with a peripheral upstanding wall 22, which is rounded at each end in concentric relation to the rotary gauging units, is straight along the upper side between the rounded ends, and is inclined along the lower side from each rounded end downwardly to the center, where there is provided an exit opening 23 having a spout 24 secured therein, it being pointed out that this hopper receives the under height articles sorted by the machine, which flow by gravity along the hopper to the spout 24, where they fall into a suitable receptacle. In line with the spout and spaced upwardly therefrom there is provided a vertically disposed baffle plate 25 to direct the articles flowing from each side toward the spout.

Intermediate the ends of the supporting base there is provided a transverse slideway, consisting of spaced parallel guide bars 26—26 and superimposed overhanging retaining bars 27—27 secured by screws 28—28 to the top flanges of the angle bars 10 and 11, and in which is guided a slide plate 29 upon which the base 30 of the motor unit 31 is secured by screws 32. Attached to the underside of the slide plate 29 near its rearward edge is a bracket 33 having a screw-eye member 34 secured therein to which one hook end of a helical extension spring 35 is connected, the other hook end being connected to an elongated eye-bolt 36 adjustably secured in the forward angle bar 10, this spring adapted in the operation of the machine to draw the motor forwardly to maintain the friction drive pulleys in driving contact with the rotary gauging units. By adjusting the eye-bolt 36 the tension of the spring and the resultant frictional engaging pressure of the pulleys may be adjusted as desired. The motor unit has mounted therein a shaft 37 extending longitudinally of the machine and extending at each side of the motor housing, being provided upon each end with a friction drive pulley 38 which may be of any suitable material, as for instance, laminated Bakelite. The shaft 37 is driven through reduction gearing, preferably consisting of a worm 39 provided upon the transversely arranged shaft 40 of the motor, and in gear with a worm wheel 41 secured upon the drive shaft 37.

The mounting base may be conveniently secured to a table or other suitable support by bolts 42 engaged through the top flanges of the angle bars 10 and 11 near their ends.

The rotary gauging unit comprises a circular gauge plate 43 provided with a central hub 44 projecting above and below it, and preferably secured thereto by welding, the bore of this hub being provided with annular recesses 45 and 46 at its respective upper and lower ends, in which are engaged the outer race members of ball-bearing ring units 47 and 48, the inner race members thereof being engaged upon the spindle shaft 14, with a tubular spacer member 49 between them. A bearing shield flanged cap 50 is engaged over the outer end of the spindle shaft 14, bearing upon the inner race member of the ball-bearing ring unit 47 and extending in spaced relation over the upper end of the hub and about its outer periphery, this cap being tightened down by means of a nut 51 engaged upon the outer threaded end of the spindle shaft 14 and tightly clamping the inner race members of the two ball-bearing units and the spacer member 49 against the base flange 16 of the spindle shaft.

The gauge plate 43 has free rotary movement about the spindle, being so positioned that there is slight clearance between its under-surface and the surface of the hopper 20. Rotation is imparted to the gauge plate through frictional engagement of the drive pulley 38 therewith under the pressure of the spring 35 exerted forwardly upon the motor unit, the opening 21 in the hopper 20 being of sufficient extent to permit of adjustment of the drive pulley upon its shaft to engage it at any desired point between the hub and the periphery of the gauge plate to thus regulate its speed as desired.

The upper surface of the gauge plate 43 is ground as close as possible to a true flat, as it constitutes one of the gauging surfaces for the articles to be gauged. In predetermined spaced relation to the upper surface of the gauging plate there are mounted two hopper drums, an inner hopper drum 52 defining a central hopper space for receiving the articles to be gauged, and an outer hopper drum 53 in concentric spaced relation to the hopper drum 52, and defining an annular hopper space for receiving certain of the articles from the central hopper space, as will presently more fully appear.

The hopper drums are supported with their lower surfaces spaced from the upper surface of the plate 43 to provide article-gauging gaps, the gauging gap of the inner drum being larger than the correct height of the articles to be gauged while the gauging gap of the outer drum corresponds to the correct height. For this purpose, the inner drum 52 is provided at equally spaced points, preferably at three points to form a tripod support, with radially projecting mounting lugs 54, integrally formed with an annular outwardly projecting base flange 55 extending about the drum, each of these mounting lugs being provided with a countersunk screw hole 56, through which is engaged an attaching screw 57 screwed into the base plate 43. In order to accurately predetermine the spacing of the drum from the gauge plate, a spacer member 58, having an open-ended bolt engaging slot 59, is engaged about the bolt between the lug 54 and the gauge plate, its inner periphery being curved to conform to the outer circumference of the flange 55 and being preferably beveled at each end as at 60, so that there is a continuous clear circumferential space between the lower surface of the drum and the gauge plate. The under-surface of the annular flange 55 is upwardly and outwardly beveled, as at 61, the lower flat surface between this beveled surface 61 and the inner periphery of the drum constituting the article-gauging surface of the drum.

In Fig. 10 is shown a modified form of the gauging gap wherein 152 and 153 are the annular side walls and 43 the bottom gauge plate. The portion of the bottom margin of walls 152 and 153 is tapered as seen at 100 and 101, with the desired gap indicated at 102 and 103. It is noted that the taper is outwardly decreasing. The provision of the tapered surfaces 100 and 101 will assist in causing the cups not passing through the gap to be carried to the uppermost portion 104 of the gauge plate 43. The precise taper depends on the design of the machine. Part or all of the taper can be formed on the plate 43, if desired. At 104 is shown a primer cup which is more than the maximum height caught in the gap and at 105 is seen a primer cup of the correct size caught in the gap. At 69 of Fig. 10 is seen a nut carried on shaft 14 which may be the same as at that shown in Fig. 5. The specific form of rings in Fig. 10 is slightly different than that described in the previous figures. The support of the walls and arrangement of the parts can be similar to that described for Figs. 1 to 9. The walls of the drums 152 and 153 are slightly exaggerated in thickness so as to more clearly illustrate the tapered gauging gap.

The outer drum 53 is mounted in a similar manner to the inner drum, being provided with an annular flange 62, mounting lugs 63 having a countersunk screw hole 64 therein, and the under surface of the flange being beveled, as at 65. The spacer members 66 are similar to the spacer members 58 of the inner drum, being provided with open-ended bolt engaging slots 67 and beveled ends 68, the inner periphery of these spacer members being curved to correspond to the outer circumference of the flange 63. The height of these spacer members is slightly less than the height of the spacer members 58, so that the gauging space between the outer drum and the gauge plate, predetermined by these spacer members, is slightly less than the gauging space of the inner drum.

In Fig. 11 the identical parts are numbered the same as in Fig. 10. Gauging gaps are shown wherein the taper is formed on the circular gauge plate 43, the bottom of the annular wall 152 and 153 being parallel with the main surface of the plate 43. 100' and 101' indicate the tapered surfaces located on the circular gauge plate 43.

The articles to be gauged, shown in the illustrated embodiment as ammunition primer cups, are flat gilding metal cups having a height in the case of .50 caliber cups A (Fig. 8) slightly less than ¼ inch and a diameter slightly greater than $\frac{5}{16}$ inch, and in the case of .30 caliber cups B (Fig. 9) having a height of about ⅛ inch and a diameter slightly greater than $\frac{3}{16}$ inch. In each case the diameter is sufficiently greater than the height so that under even slight agitation the cups will lie flat on either end instead of standing upon their circumference, and consequently when a quantity of them is placed in the central hopper space of the rotating gauging unit they tend to lie flat on the inclined gauge plate 43, where they tend to move to the lower end of the hopper space and to be carried upwardly at the periphery as the plate rotates. In Fig. 10, the tapered gap assists in the movement of the cups upwardly inasmuch as at least some of the cups will be wedged therein. The elevation of the inner hopper drum is so adjusted with respect to the proper height dimension of the articles being gauged that if they are of acceptable height, or less, they will slip through the gap of the inner hopper drum into the annular hopper space between the inner and outer drums, while the "high" cups, that is, those over the acceptable height, stick in the gap and are carried up around the periphery of the central hopper space, or are carried up by friction or centrifugal force, where they are automatically removed by a removal and conveying means, presently to be described, interposed in the path of the gap slightly past the vertical center of the direction of rotation. Those cups which have slipped through the gap of the inner hopper drum fall down into the annular hopper space between the inner and outer drums. The elevation of the outer drum is so adjusted that the "low" cups, that is those less than acceptable height, will slip through the gap of the outer hopper drum, whereas the cups of acceptable height stick in the gap or do not pass therethrough and are carried up around the periphery of the annular hopper space, where they are automatically removed by removal and conveying means, presently to be described, interposed in the path of the gap slightly past the vertical center of the direction of rotation. The "low" cups which have passed through the gap of the outer hopper drum fall into the pan hopper 20 and slide by gravity to the outlet opening 23 and spout 24 where they drop into a suitable receptacle.

Upon the upper threaded end of the spindle shaft 14 there is rigidly secured by means of a nut 69 the lower apertured end portion 70 of a bracket arm 71, the latter being tangentially offset from the axis of the shaft, so that it extends across the rotary gauging unit parallel to the vertical central plane of the unit, and slightly offset therefrom in the clockwise direction of rotation of the unit, as illustrated in Fig. 2. The arm 71 is provided at its upper end with a downwardly extending diagonally disposed mounting portion 72, disposed within the central hopper space of the inner drum 52 for supporting therein its article removing and conveying means, presently to be more fully described. The arm 71 has secured thereto, preferably by means of a welded bracket plate 73 an extension arm 74 extending upwardly at an inclined angle therefrom and bent laterally at its upper portion, so as to bridge over the upper edge of the inner drum 52, being provided at its upper end with a downwardly extending diagonally disposed mounting portion 75, preferably braced by a welded brace plate 76 and disposed within the annular hopper space of the outer drum 53 for supporting therein its article removing and conveying means, presently to be more fully described. The mounting portions 72 and 75 are each disposed at the same angle, preferably 45°, and each extend into contiguous relation of the upper surface of the gauge plate 43 with a slight clearance to permit free rotary movement of the plate beneath them.

The article removing means for the inner and outer hopper drums 52 and 53 are respectively mounted upon the mounting portions 72 and 75 of the bracket arm, and are respectively connected to flexible conveying tubes 77 and 78, extending to suitable receptacles, the tube 77 being bridged over both the inner and outer drums, and the tube 78 being bridged over the outer drum, and both being inclined downwardly so that the articles fed therein flow by gravity to the receptacles. As both of the article removing means are identical, only one of them will be described in detail, and the same reference characters will be applied to both.

The removal means, illustrated in Fig. 7 as mounted upon the mounting portion 72, comprises a rectangular block 79 disposed in diagonal relation to the drum and secured upon the diagonally disposed mounting portion 72 by means of screws 80, being provided through its rearward end with a socket passage 81 in which the end of the conveyor tube 77 is secured by set screws 82, and provided in its forward end with an inwardly convergent funnel mouth 83 extending to the passage 81. The mouth 83 extends at its lower side to a lower side wall extension portion 84, and extends at its base to a base wall extension portion 85 having its upper surface inclined downwardly to a relatively sharp forward edge 86, the latter extending diagonally from the forward edge of the lower side wall extension portion 84 to the opposed upper side wall. The edge 86 is contiguous to the gauge plate with slight clearance between them. This base wall portion 85 constitutes an article scoop having its edge disposed at a slightly divergent angle to the inner surface of the drum, while the forward edge of the side wall extension is sufficiently spaced from the drum so that articles caught in its gap and projecting to some extent will be carried into the scoop. Articles which may ride upon the surface of the gauge plate close to the drum, but not caught in the gauging gap, will be diverted through engagement with the extension 89 of the removal means.

Upon the upper side of the head member there is provided a knock-out finger member 87, secured thereto by screws 88, and having a curved end portion 89 extended in divergent spaced relation to the forward edge of the side wall extension portion and tapered to a relatively sharp end edge. The curved finger portion is of a height slightly less than the gauging gap between the drum and the gauge plate, and is disposed therein with its end edge slightly beyond the outer circumference of the flat gauging surface of the drum and slightly within the circumference of the spacer members 58, so that it constitutes an article camming fence within the gauging gap, whereby the articles caught in the gap and carried upwardly therein are removed therefrom and guided into the scoop end of the head member from which they flow through the conveyor tube to the receptacle.

In the operation of the machine, the primer cups, or other articles to be gauged, are placed in the central hopper space of the rotary gauging unit and slide by gravity and centrifugal force toward the inner hopper drum 52, the gauging gap of which is slightly larger than the estimated satisfactory height of proper height articles, so that the acceptable height articles, and those of less than acceptable height, slide through the gap into the annular hopper space between the inner and outer hopper drums 52 and 53. The "high" articles of greater than acceptable height are caught in the gap between the drum 52 and the gauge plate 43, or do not pass therethrough, and are carried up at the periphery of the hopper space where they are removed by the curved knock-out finger portion 89 and scooped into the tube head member, from which they flow by gravity through the tube 77 to the receptacle 90. The "low" articles in the annular hopper space slide through the gauging gap of the outer hopper drum 53, dropping on to the pan hopper 20 and flowing by gravity to the spout 24 where they drop into the receptacle 91. The gauging gap of the outer drum 53 corresponds to the proper height articles and these are caught in the gap, or do not pass therethrough, and carried upwardly at the periphery of the hopper space where they are removed by the curved knock-out finger portion 89 and scooped into the tube head, from which they flow by gravity through the tube 78 to the receptacle 92.

In order to adapt the machine for its alternative use in the gauging of different sized articles, as for instance, the .30 caliber primer cups B, as shown in Fig. 9, the set of spacer members, as shown in Fig. 4, having height dimensions for gauging the smaller size articles are substituted. Also the knock-out fingers, as shown in Fig. 8, are removed and knock-out fingers, as shown in Fig. 9, are substituted, these latter having a curved finger extension 89a of reduced height to fit the smaller gauging gaps for the smaller size articles.

The form of the invention illustrated in the drawings and described herein is typical and illustrative only, and it is evident that the invention is capable of embodiments in other forms, all falling within the scope of the appended claims.

What is claimed is:

1. In a gauging machine for gauging the height of articles placed therein, a rotatable hopper having a base and an annular side wall, there being an annular height-gauging gap between said side wall and said base, whereby articles of a height corresponding to said gap are caught therein while articles of less height pass through said gap, removable spacer bearing means between said base and said side wall arranged out of the annular path of said gap adapted to determine the height of said gap, and article removing and conveying means including a stationary part disposed and extending into said gap in the path of articles carried therein adapted to remove positively such articles therefrom to said conveying means.

2. In a gauging machine for gauging the height of articles placed therein, a rotatable hopper unit comprising a base plate having an upwardly disposed flat gauge surface, and a hopper drum mounted upon said plate and having a lower circumferential gauge surface spaced from said gauge surface of said plate to provide an article-gauging gap, and article removing and conveying means including a stationary part disposed and extending into said gap in the path of articles carried therein adapted to remove positively such articles therefrom to said conveying means.

3. In a gauging machine for gauging the height of articles placed therein, a rotatable hopper unit comprising a base plate having an upwardly disposed flat gauge surface, a hopper drum mounted upon said plate in concentric relation to its axis and having a lower circumferential gauge surface spaced from said gauge surface of said plate to provide an article gauging gap, and a second hopper drum mounted upon said plate in surrounding concentric spaced relation to said first hopper drum, having a lower gauging surface spaced from said gauging surface of said plate to provide a second article gauging gap of less height than said first gauging gap, article removing and conveying means including a stationary part disposed and extending into said first gauging gap in the path of articles carried therein adapted to remove positively such articles therefrom to said conveying means, and a second article removing and conveying means including a stationary part disposed and extending into said second gauging gap in the path of articles carried therein adapted to remove positively such articles therefrom to said second conveying means.

4. In a gauging machine for gauging the height of articles placed therein, a spindle shaft, a rotatable hopper unit mounted on said shaft comprising a base plate having an upwardly disposed flat gauge surface, and a hopper drum mounted upon said plate in concentric relation to its axis and having a lower circumferential gauge surface spaced from said gauge surface of said plate to provide an article gauging gap, a fixed bracket member mounted upon said spindle shaft above said plate, and article removing and conveying means carried by said bracket including a part disposed in said gap in the path of articles carried therein adapted to remove such articles therefrom to said conveying means.

5. In a gauging machine for gauging the height of articles placed therein, a spindle shaft, a rotatable hopper unit mounted on said shaft comprising a base plate having an upwardly disposed flat gauge surface, a hopper drum mounted upon said plate in concentric relation to its axis and having a lower circumferential gauge surface spaced from said gauge surface of said plate to provide an article gauging gap, and a second hopper drum mounted upon said plate in surrounding concentric spaced relation to said first hopper drum having a lower gauging surface spaced from said gauging surface of said gauge plate to provide a second article gauging gap, a fixed bracket member mounted upon said spindle shaft above said plate and bridging over said first hopper drum, article removing and conveying means carried by said bracket inwardly of said first hopper drum and including a part disposed in said first gauging gap in the path of the articles carried therein adapted to remove such articles therefrom to said conveying means, and a second article removing and conveying means carried by said bracket inwardly of said second hopper drum and including a part disposed in said second gauging gap in the path of articles carried therein adapted to remove such articles therefrom to said second conveying means.

6. In a gauging machine for gauging the height of articles placed therein, an inclined spindle shaft, an inclined stationary hopper pan member having an opening through which said spindle is engaged, a rotatable hopper unit mounted upon said shaft comprising a base plate extending at its periphery beyond the edge of said opening in said hopper pan and having an upwardly disposed flat gauge surface, a hopper drum mounted upon said plate in concentric relation to its axis and having a lower circumferential gauge surface spaced from said gauge surface of said plate to provide an article gauging gap, a second hopper drum mounted upon said plate in surrounding concentric spaced relation to said first hopper drum having a lower gauging surface spaced from said gauging surface of said plate to provide a second article gauging gap of less height than said first article gauging gap, article removing means respectively disposed in relation to said first and second gauging gaps to respectively remove articles carried therein, and a friction drive pulley engaged through said opening of said hopper pan with the under surface of said base plate.

7. In a gauging machine for gauging the height of articles placed therein, a supporting base, a pair of inclined spindle shafts carried thereby, an inclined stationary hopper pan member having a pair of openings through which said spindle shafts are respectively engaged, a pair of rotatable hopper units mounted upon said respective spindle shafts, each comprising a base plate extending at its periphery beyond the edge of one of said openings in said hopper pan and having an upwardly disposed flat gauge surface, a hopper drum mounted upon said plate in concentric relation to its axis and having a lower circumferential gauge surface spaced from said gauge surface of said plate to provide an article gauging gap, a second hopper drum mounted upon said plate in surrounding concentric spaced relation to said first hopper drum having a lower gauging surface spaced from said gauging surface of said plate to provide a second article gauging gap of less height than said first article gauging gap, and article removing means respectively disposed in relation to said first and second gauging gaps to respectively remove articles carried therein, a drive shaft, and a pair of friction drive pulleys carried by said drive shaft and respectively engaged through said openings of said hopper pan with the under surface of said base plates of said respective hopper units.

8. In a gauging machine for gauging the height of articles placed therein, a rotatable hopper unit comprising a base plate having an upwardly disposed flat gauge surface, a hopper drum mounted upon said plate having a lower circumferential gauge surface spaced from said gauge surface of said plate to provide an article gauging gap, and article removing and conveying means comprising a gravity feed conveyor tube, a head member connected to said tube and having a divergent scoop mouth contiguous to said plate and drum, and a knock-out finger carried by said head and projecting into said gap in the path of articles carried therein adapted to remove such articles therefrom to said head and tube.

9. In a gauging machine for gauging the height of articles placed therein, a rotatable hopper with an inclined axis of rotation, said hopper having a base and an annular side wall, there being an annular height-gauging gap between said side wall and base, and an article removing and conveying means including a scoop adjacent the uppermost portion of said gap, adapted to remove articles from the hopper as they are carried thereto.

10. In a gauging machine for gauging the height of articles placed therein, a rotatable hopper with an inclined axis of rotation, said hopper having an inclined base and an annular side wall, there being an annular height-gauging gap between said side wall and base, and an article removing and conveying means including a part disposed in said gap substantially at the uppermost portion thereof in the path of articles carried therein, adapted to remove such articles therefrom to said conveying means, said articles flowing by gravity through said conveying means.

11. In a gauging machine for gauging the height of articles placed therein, a rotatable hopper having a base and an annular side wall rotating with said base, there being an annular height-gauging gap between said wall and said base, said gap being tapered, said taper decreasing away from the center of rotation of the hopper, whereby articles of a height corresponding to said gap are caught therein while articles of less height pass through said gap, and an article removing and conveying means including a stationary part disposed and extending into said tapered gauging gap in the path of articles therein adapted to remove positively articles therefrom to said conveying means.

12. In a gauging machine for gauging the height of articles placed therein, a rotatable hopper with an inclined axis of rotation, said hopper having a base and an annular side wall, there being a tapered annular height-gauging gap between said side wall and said base, said taper decreasing away from the center of rotation of said hopper, and an article removing and conveying means, including a scoop adjacent the uppermost portion of said gap, adapted to remove articles from the hopper as they are carried thereto.

13. In a gauging machine for gauging the height of articles placed therein, a rotatable hopper with an inclined axis of rotation, said hopper having an inclined base and an annular side wall, there being an outwardly decreasing taper annular height-gauging gap between said side wall and base, and an article removing and conveying means, including a part disposed in said gap substantially at the uppermost portion thereof in the path of articles carried therein, adapted to remove such articles therefrom to said conveying means, said articles flowing by gravity through said conveying means.

14. In a gauging machine for gauging the height of articles placed therein, a spindle shaft, a rotatable hopper unit mounted on said shaft comprising a base plate having an upwardly disposed flat gauge surface, a hopper drum mounted upon said plate in concentric relation to its axis and having a lower circumferential gauge surface spaced from said gauge surface of said plate to provide an article-gauging gap, said surfaces being outwardly decreasingly tapered relative to each other, and a second hopper drum mounted upon said plate in surrounding concentric spaced relation to said first hopper drum having a lower gauging surface spaced from said gauging surface of said gauge plate to provide a second tapered article-gauging gap, a fixed bracket member mounted upon said spindle shaft above said plate and bridging over said first hopper drum, article removing and conveying means carried by said bracket inwardly of said first hopper drum and including a part disposed in said first gauging gap in the path of the articles carried therein adapted to remove such articles therefrom to said conveying means, and a second article removing and conveying means carried by said bracket inwardly of said second hopper drum and including a part disposed in said second gauging gap in the path of articles carried therein adapted to remove such articles therefrom to said second conveying means.

15. In a gauging machine for gauging the height of articles placed therein, a supporting base, a pair of inclined spindle shafts carried thereby, an inclined stationary hopper pan member having a pair of openings through which said spindle shafts are respectively engaged, a pair of rotatable hopper units mounted upon said respective spindle shafts, each comprising a base plate extending at its periphery beyond the edge of one of said openings in said hopper pan and having an upwardly disposed flat gauge surface, a hopper drum mounted upon said plate in concentric relation to its axis and having a lower circumferential gauge surface spaced from said gauge surface of said plate to provide an article-gauging gap, said surface being outwardly decreasingly tapered relative to said lower surface, a second hopper drum mounted upon said plate in surrounding concentric spaced relation to said first hopper drum having a lower gauging surface spaced from said gauging surface of said plate to provide a second tapered article-gauging gap of less height than said first article-gauging gap, and article removing means respectively disposed in relation to said first and second gauging gaps to respectively remove articles carried therein, a drive shaft, and a pair of friction drive pulleys carried by said drive shaft and respectively engaged through said openings of said hopper pan with the under-surface of said base plates of said respective hopper units.

WILSON W. SCOTT.
CLIFFORD L. LEWIS.